United States Patent
Sodhi et al.

(10) Patent No.: US 9,400,545 B2
(45) Date of Patent: Jul. 26, 2016

(54) METHOD, APPARATUS, AND SYSTEM FOR ENERGY EFFICIENCY AND ENERGY CONSERVATION INCLUDING AUTONOMOUS HARDWARE-BASED DEEP POWER DOWN IN DEVICES

(75) Inventors: Inder M. Sodhi, Folsom, CA (US); Alon Naveh, Ramat Hasharon (IL); Doron Rajwan, Rishon Le-Zion (IL); Ryan D. Wells, Folsom, CA (US); Eric C. Samson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 131 days.

(21) Appl. No.: 13/335,738

(22) Filed: Dec. 22, 2011

(65) Prior Publication Data

US 2012/0179927 A1    Jul. 12, 2012

(51) Int. Cl.
*G06F 1/32* (2006.01)

(52) U.S. Cl.
CPC ............ *G06F 1/3287* (2013.01); *G06F 1/3206* (2013.01); *G06F 1/3278* (2013.01); *Y02B 60/126* (2013.01); *Y02B 60/1282* (2013.01)

(58) Field of Classification Search
CPC ...... G06F 1/325; G06F 1/3287; G06F 1/3296
USPC .................. 713/320, 322, 323, 324
See application file for complete search history.

(56) References Cited

U.S. PATENT DOCUMENTS

| | | | |
|---|---|---|---|
| 5,493,684 A * | 2/1996 | Gephardt et al. ............ 713/322 |
| 6,971,034 B2 | 11/2005 | Samson et al. | |
| 7,137,018 B2 | 11/2006 | Gutman et al. | |
| 7,149,909 B2 | 12/2006 | Cui et al. | |
| 7,191,349 B2 | 3/2007 | Kaushik et al. | |
| 7,197,651 B2 | 3/2007 | Idan et al. | |
| 7,222,253 B2 | 5/2007 | Samson et al. | |
| 7,299,370 B2 | 11/2007 | George et al. | |
| 7,343,502 B2 | 3/2008 | Samson et al. | |
| 7,363,523 B2 | 4/2008 | Kurts et al. | |
| 7,401,241 B2 | 7/2008 | Rotem et al. | |
| 7,451,333 B2 | 11/2008 | Naveh et al. | |
| 7,664,970 B2 | 2/2010 | Jahagirdar et al. | |
| 7,698,575 B2 | 4/2010 | Samson | |
| 7,917,784 B2 * | 3/2011 | de Cesare et al. ............ 713/320 |

(Continued)

FOREIGN PATENT DOCUMENTS

TW    200825706 A    6/2008

OTHER PUBLICATIONS

Office Action and Taiwan Search Report from foreign counterpart Taiwan Patent Application No. 101145429, mailed Oct. 21, 2014, 9 pages.

*Primary Examiner* — Vincent Tran
(74) *Attorney, Agent, or Firm* — Nicholson De Vos Webster & Elliott LLP

(57) ABSTRACT

Embodiments of systems, apparatuses, and methods for energy efficiency and energy conservation including enabling autonomous hardware-based deep power down of devices are described. In one embodiment, a system includes a device, a static memory, and a power control unit coupled with the device and the static memory. The system further includes a deep power down logic of the power control unit to monitor a status of the device, and to transfer the device to a deep power down state when the device is idle. In the system, the device consumes less power when in the deep power down state than in the idle state.

24 Claims, 11 Drawing Sheets

(56) References Cited

U.S. PATENT DOCUMENTS

| | | | |
|---|---|---|---|
| 7,925,899 B2 | 4/2011 | Gumma et al. | |
| 8,117,428 B2 * | 2/2012 | Breton et al. | 713/1 |
| 8,230,247 B2 * | 7/2012 | Haj-Yihia | 713/322 |
| 2002/0162037 A1 * | 10/2002 | Woods et al. | 713/322 |
| 2004/0153762 A1 * | 8/2004 | Flynn et al. | 714/15 |
| 2005/0018568 A1 * | 1/2005 | Tsuda et al. | 369/47.32 |
| 2005/0064829 A1 * | 3/2005 | Kang et al. | 455/127.1 |
| 2006/0137377 A1 | 6/2006 | Samson et al. | |
| 2006/0143484 A1 | 6/2006 | Samson et al. | |
| 2007/0214289 A1 * | 9/2007 | Samson et al. | 710/18 |
| 2007/0242076 A1 | 10/2007 | Samson et al. | |
| 2008/0072088 A1 * | 3/2008 | Allarey et al. | 713/324 |
| 2008/0168285 A1 | 7/2008 | de Cesare et al. | |
| 2009/0199024 A1 * | 8/2009 | Jahagirdar et al. | 713/300 |
| 2009/0259863 A1 * | 10/2009 | Williams et al. | 713/323 |
| 2010/0106886 A1 * | 4/2010 | Marcu et al. | 711/102 |
| 2010/0115304 A1 | 5/2010 | Finkelstein et al. | |
| 2010/0146311 A1 * | 6/2010 | Jahagirdar et al. | 713/300 |
| 2010/0162006 A1 | 6/2010 | Therien et al. | |
| 2010/0268968 A1 * | 10/2010 | Ghiasi et al. | 713/300 |
| 2011/0060928 A1 * | 3/2011 | Khodorkovsky et al. | 713/323 |
| 2011/0078463 A1 * | 3/2011 | Fleming et al. | 713/300 |
| 2011/0078702 A1 * | 3/2011 | Hosoki | 718/108 |
| 2011/0099405 A1 * | 4/2011 | Voutilainen | 713/324 |
| 2011/0154011 A1 | 6/2011 | Efraim et al. | |
| 2011/0231681 A1 | 9/2011 | Allarey et al. | |
| 2012/0159496 A1 * | 6/2012 | Dighe | G06F 9/4893 718/102 |
| 2012/0166839 A1 * | 6/2012 | Sodhi | G06F 1/206 713/322 |
| 2012/0166852 A1 * | 6/2012 | Sodhi et al. | 713/324 |
| 2012/0242671 A1 * | 9/2012 | Wyatt | 345/520 |
| 2012/0249559 A1 * | 10/2012 | Khodorkovsky et al. | 345/502 |
| 2013/0007492 A1 * | 1/2013 | Sokol et al. | 713/322 |
| 2013/0093777 A1 * | 4/2013 | He et al. | 345/522 |

* cited by examiner

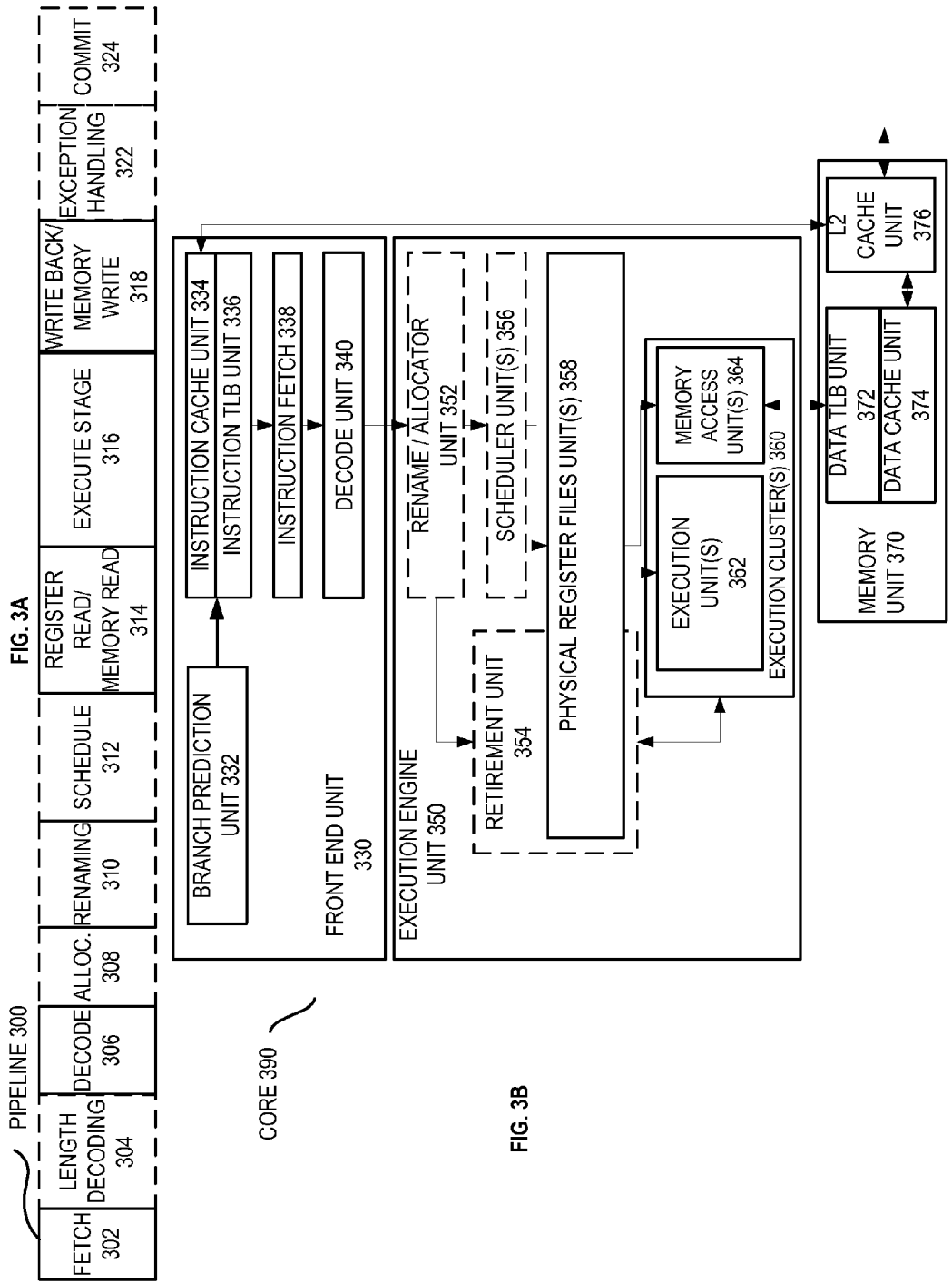

METHOD, APPARATUS, AND SYSTEM FOR ENERGY EFFICIENCY AND ENERGY CONSERVATION INCLUDING AUTONOMOUS HARDWARE-BASED DEEP POWER DOWN IN DEVICES

FIELD

This disclosure pertains to energy efficiency and energy conservation in integrated circuits, and in particular but not exclusively, to reducing power consumption of devices in a computer processing system.

BACKGROUND

Advances in semi-conductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

BRIEF DESCRIPTION OF THE DRAWINGS

The present invention is illustrated by way of example and not limitation in the figures of the accompanying drawings, in which like references indicate similar elements and in which:

FIG. 3A is a block diagram illustrating both an exemplary in-order pipeline and an exemplary register renaming, out-of-order issue/execution pipeline according to embodiments of the invention.

FIG. 3B is a block diagram illustrating both an exemplary embodiment of an in-order architecture core and an exemplary register renaming, out-of-order issue/execution architecture core to be included in a processor according to embodiments of the invention.

DETAILED DESCRIPTION

Figure 1:
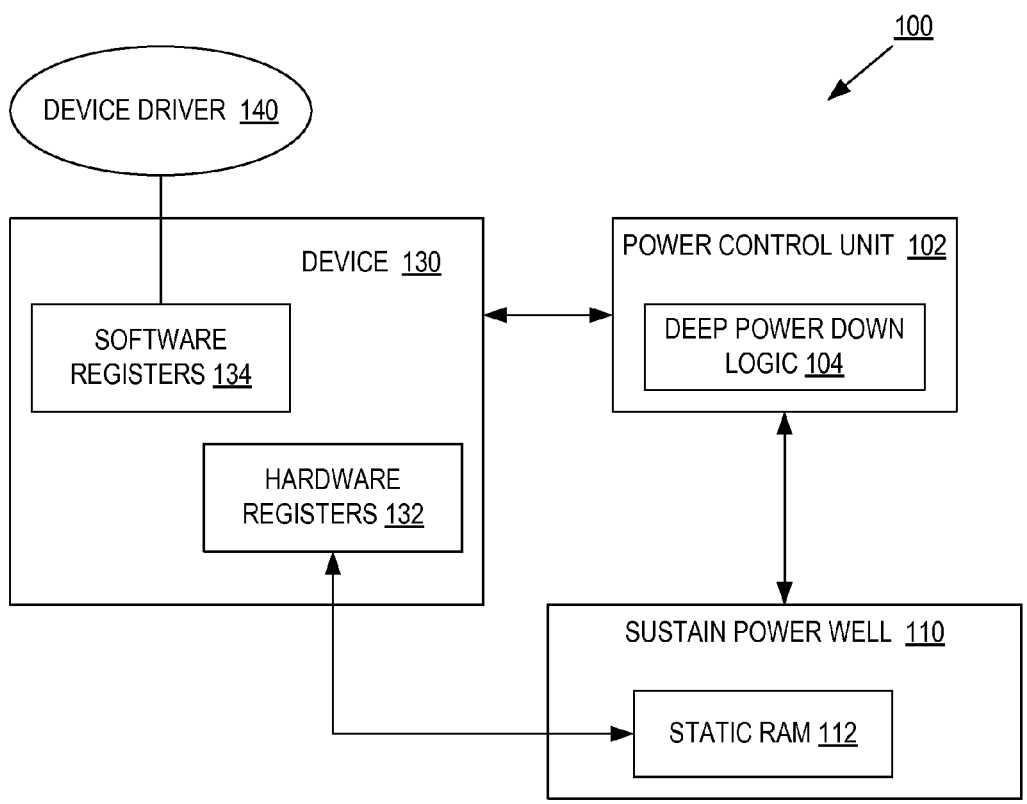
FIG. 1 illustrates a block diagram of a system with deep power down for devices.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Although the following embodiments are described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems, and may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Below are embodiments for enabling autonomous deep power down in devices in a processing system, which is beneficial in reducing energy consumption of the devices, as well as reducing the overall energy consumption of the processing system. Computing systems consume power when they are active, such as when they are performing processing operations, displaying data, etc. In order to save power when the computing system is not active, processing cores may enter a deep power down state. The deep power down state enables the processing core's voltage to be reduced, which in turn lowers the power consumption of the processing core. In embodiments discussed herein, a device, such as a graphics processing device, display, peripheral component interconnect (PCI) controller, image signal processor, audio accelerators, video accelerators, etc., is enabled to enter a deep power down state without software intervention. In one embodiment, the device is monitored to determine when the device goes idle. In one embodiment, when the device goes idle, a dedicated static random access memory (static RAM) stores context data (e.g., a boot context, data within internal registers, etc.) for the device, a sustain rail for the RAM provides a nominal amount of power to enable the RAM to maintain storage of the context data, and the device is set to a deep power down state. In one embodiment, the deep power down state is a C6 power state. In one embodiment, the storage of context data and entry into a deep power down state enables the device's internal voltage to be lowered to any value, including zero which would completely turn off the device. Thus, power consumption by the device may be minimized, and even eliminated, by placing the device in a deep power down state.

In one embodiment, the device is further monitored to determine when the device is to wake from the deep power down state. In one embodiment, when the device wakes from the deep power down, and is powered back on, the context data is loaded from the dedicated static RAM into the device. In one embodiment, the context data is loaded into the device so that the device has the same configuration as when the device entered into the deep power down state, and the device's entry into and exit from the deep power down state is transparent to the processing system and software applications executed by the processing system. Furthermore, as will be discussed in greater detail below, when a device is determined to be idle and is placed in a deep power down state, as well as when the device is determined to be awoken to exit the deep power down state, may be determined by different heuristics.

FIG. 1 illustrates a block diagram of a system 100 with deep power down for devices. In one embodiment, the system 100 is part of a larger computer processing system such as those illustrated in FIGS. 6-9 below. In one embodiment, system 100 includes a sustain power well 110, a power control unit 102, and a device 130.

As discussed above, the device 130 may be a graphics processing device, display, PCI controller, etc. In one embodiment, the operation of device 130 is controlled by a device driver 140. In one embodiment, the device driver 140 is software, hardware, or a combination that enables device 130 to interact with a processing system. In one embodiment, power control unit 102 includes deep power down logic 104, such as a hardware-based finite state machine, to monitor the status of device 130. In one embodiment, deep power down logic 104 is an always-awake logic that monitors the state of the device 130, by monitoring commands received from the device driver 140, operations performed on registers 132, 134, power control operations, transactions between device 130 and other devices (not shown) or a CPU core (not shown) of system 100, etc. In one embodiment, deep power down logic 104 determines based on the monitored state of the device 130 whether the device is idle (i.e., is not receiving commands, has not received a register read or write command in a given time, etc.), and that the device 130 should enter a deep power down state.

In one embodiment, power control unit 102 initiates the process of placing device 130 in a deep power down state. In one embodiment, power control unit 102 stores context data maintained by device 130 in registers 132, 134, as well as other context data, in static RAM 112. In one embodiment, static RAM 112 is a dedicated RAM. In one embodiment, the context data provides a snapshot of the state that the device 130 was in before device 130 entered a deep power down state. In one embodiment, static RAM 112 is coupled with a sustain power well 110 which provides sufficient power to static RAM 112 to retain the integrity of the context data. However, the power provided by the sustain power well 110 to static RAM 112 is less than the power that would be need to operate a processor and maintain the device 130 in an idle state. In one embodiment, the device 130 is placed in the deep power down state to save energy utilized by system 100 by conserving the energy that device 130 would have consumed should the device 130 have remained in an idle state, and not a deep power down state. In one embodiment, each device, such as device 130, has its own static RAM and sustain rail for entering and exiting a deep power down state.

In one embodiment, deep power down logic 104 of power control unit 102 continues to monitor device 130 to determine when the device 130 is to enter a wake state (i.e., leave the deep power down state, and power up for regular operation). In one embodiment, deep power down logic 104 monitors registers 132, 133, device driver 140, etc. to determine when one or more services of device 130 are requested. In one embodiment, in response to deep power down logic 104 determining that device 130 should enter a wake state, power control unit 102 loads the context data from static RAM 112 into device 130. In one embodiment, the context data returns device 130 to the state the device 130 was in before it entered the deep power down state, such as by restoring the values in registers 132, 134, setting device configurations, etc. Device 130 may then perform tasks in the wake state.

In one embodiment, as discussed herein, device 130 is enabled to enter and exit a deep power down state transparently to other devices or software in a processing system, such as those illustrated in FIGS. 6-9. Thus, although the system in which device 130 is located is not in an idle or deep power down state, device 130 may enter a deep power down state when the device 130 is idle, thereby saving energy usage by the device 130. Furthermore, power control unit 102 may further transition device 130 into and out of a deep power down state based on several heuristics.

In one embodiment, device 130 will enter a deep power down state when a central processing unit (CPU) core (not shown) of system 100 enters an idle mode. In one embodiment, because the device 130 will eventually follow the CPU core into idle, power control unit 102 sends device 130 to a deep power down state in lockstep with the CPU core. In another embodiment, when the device 130 is idle, but a CPU core is not idle, power control unit 102 may still send device 130 to a deep power down state based on the idle nature of the device 130. By not locking the device 130 into the same power status of a CPU core, power control unit 102 is enabled to take advantage of periods of device 130 idleness that may be substantially greater than those of the CPU core, thus leading to wakeup rate frequencies that are substantially lower than those for a CPU core or operating system. Furthermore, energy usage by the device 130 may be reduced by enabling entry into a deep power down state independent of a CPU core.

Similarly, power control unit 102 may cause device 130 to enter a wake state in accordance with a CPU core, or independently of the CPU core. In one embodiment, when the CPU core goes idle, device 130 will also eventually go idle, and will not become active again until the CPU core becomes busy again. Thus, in one embodiment, when a CPU core exits a deep power down state, device 130 again follows the CPU core in lockstep and also exits a deep power down state. By enabling some of the device's 130 wake time to be in parallel with the CPU core wake time, impact on the CPU's power consumption and performance may be reduced. In another embodiment, the device 130 may remain in a deep power down state even when a CPU core enters a wake state. By providing device 130 with an independent wake period, power may be conserved for extended periods of device 130 idle time.

In one embodiment, deep power down logic 104 of power control unit 102 may decide which heuristic (i.e., following the deep power down state of a CPU core, or transitioning to/from a deep power down state independent of a CPU core) power control unit 102 applies to device 130. In one embodiment, deep power down logic 104 may decide on-the-fly based on one or more metrics for a status of device 130, status of components of system 100, a pattern or timing of commands received by device 130, a pattern or timing of read/write operations at registers 132, 134, a pattern or timing of transactions with another device or a CPU core, etc. In one embodiment, deep power down logic 104 monitors the various metrics associated with device 104, other devices, and a processing system over an interval of time to determine which heuristic (i.e., following the deep power down state of a CPU core, or transitioning to/from a deep power down state independent of a CPU core) can be employed to obtain a maximal power/performance optimization point. In one embodiment, deep power down logic 104 periodically monitors the various metrics to update which heuristic is currently being employed by deep power down logic 104. For example, deep power down logic 104 could determine that for a given interval, device 130 should follow a processor's deep power down state changes, but for a different interval determine that device 130 should independently enter and exit a deep power down state.

Figure 2A:
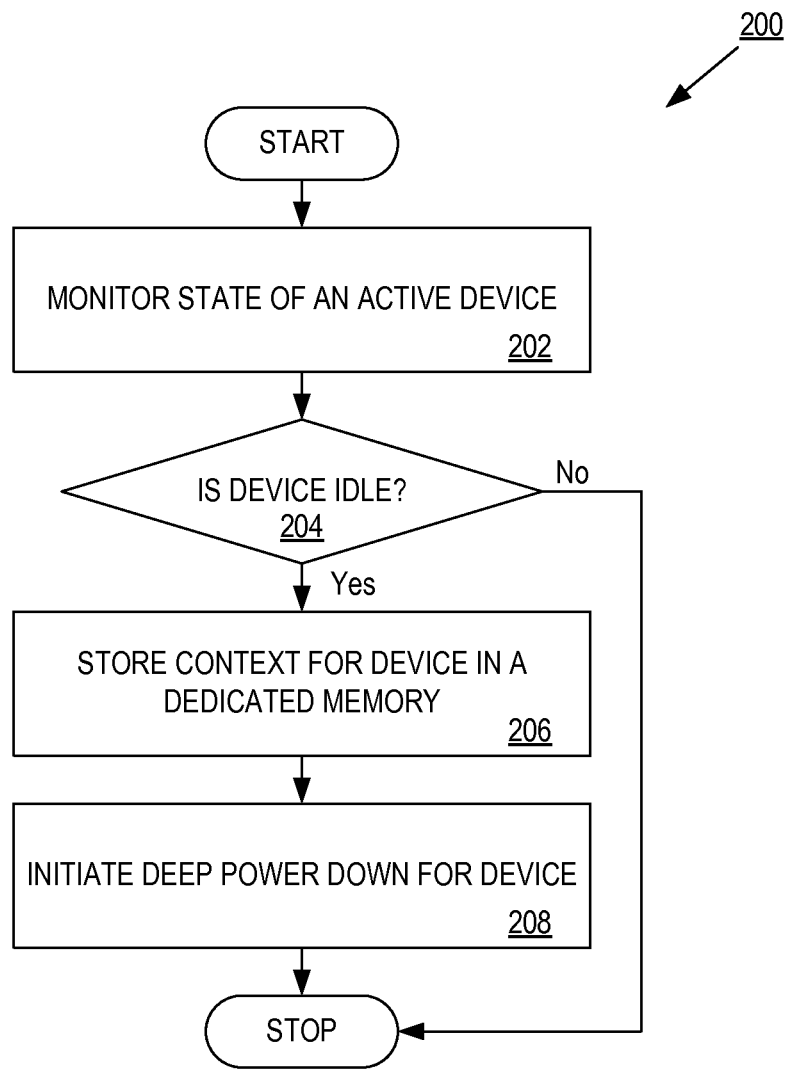
FIG. 2A illustrates an embodiment of a method for performing deep power down in a device of a processing system.

FIG. 2A illustrates an embodiment of a method 200 for initiating deep power down in a device of a processing system. In one embodiment, the method is performed by a processing logic, such as a hardware-based finite state machine.

In one embodiment, an active device, such as a graphics controller, monitor, PCI interface, etc. is monitored (processing block 202). In one embodiment, the device is monitored at periodic intervals, or continuously. In one embodiment, operations requested of the device, performed by the device, and transactions between the device and other devices in a processing system are monitored. Furthermore, internal device operations, such as register read/write operations and power operations of the device, are also monitored. In one embodiment, the status of other devices in a processing system, such as that status of CPU core(s), are also monitored.

In one embodiment, processing logic determines whether the device is idle (processing block 204). In one embodiment, the device is determined to be idle based on one or more heuristics. In one embodiment, the device is determined to be idle when a CPU core is also determined to be in an idle or deep power down state. In another embodiment, the device is determined to be idle when the device has not performed an operation for a given amount of time (e.g., in 0.5 milliseconds, a time interval based on a power/policy mode for the device, etc.).

In one embodiment, when processing logic determines that the device is not idle (processing block 204), the process ends. However, when processing logic determines that the device is idle, processing logic stores device context data in a dedicated memory (processing block 206), and transfers the device to a deep power down state (processing block 208). In one embodiment, the dedicated memory is a static RAM memory. In one embodiment, the deep power down state is a C6 power state.

Figure 2B:
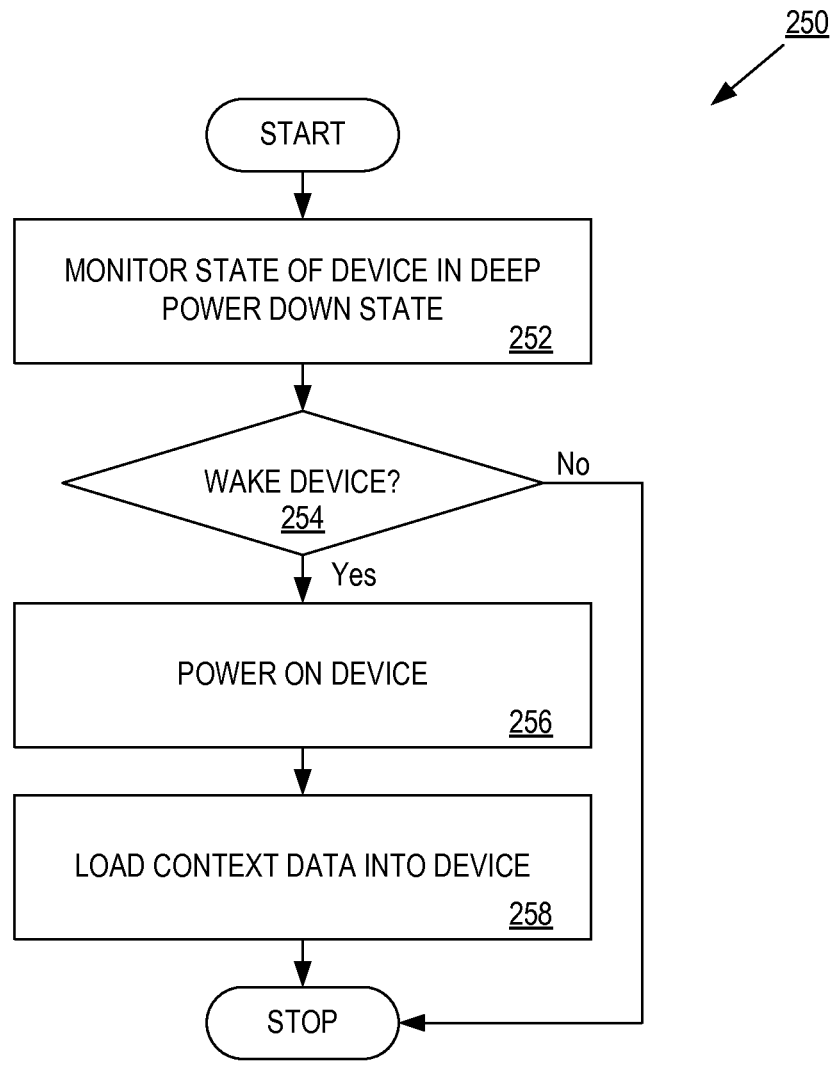
FIG. 2B illustrates an embodiment of a method for waking a device from a deep power down state of a processing system.

FIG. 2B illustrates an embodiment of a method 250 for waking a device from the deep power down state. In one embodiment, the method is performed by a processing logic, such as a hardware-based finite state machine.

In one embodiment, a device in the deep power down state, such as a graphics controller, monitor, PCI interface, etc. is monitored (processing block 252). As discussed above, various aspects concerning the device may be monitored, as well as aspects concerning other devices and computer processing system components.

In one embodiment, processing logic determines whether the device should be awoken from the deep power down state (processing block 254). In one embodiment, processing logic will cause the device to enter a wake state according to one or more heuristics, as discussed herein. In one embodiment, the device will enter a wake state when a CPU core transitions from an idle or deep power down state to a wake state. In another embodiment, processing logic will cause the device to enter a wake state when a transaction requests an action by the device. For example, when another device or CPU requests the device to perform an operation, when a register read/write request is received by the device, etc.

When processing logic determines that the device should not leave the deep power down state, the process ends. However, when processing logic determines that the device should wake, processing logic initiates the powering on of the device to an active state (processing block 256) and loads context data into the device (processing block 258). In one embodiment, the context data is data from device registers, as well as other data, that was maintained by the device before the device entered deep power down.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-Of-Order Core Block Diagram

FIG. 3A is a block diagram illustrating both an exemplary in-order pipeline and an exemplary register renaming, out-oforder issue/execution pipeline according to embodiments of the invention. FIG. 3B is a block diagram illustrating both an exemplary embodiment of an in-order architecture core and an exemplary register renaming, out-of-order issue/execution architecture core to be included in a processor according to embodiments of the invention. The solid lined boxes in FIGS. 3A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 3A, a processor pipeline 300 includes a fetch stage 302, a length decode stage 304, a decode stage 306, an allocation stage 308, a renaming stage 310, a scheduling (also known as a dispatch or issue) stage 312, a register read/memory read stage 314, an execute stage 316, a write back/memory write stage 318, an exception handling stage 322, and a commit stage 324.

FIG. 3B shows processor core 390 including a front end unit 330 coupled to an execution engine unit 350, and both are coupled to a memory unit 370. The core 390 may be a reduced instruction set computing (RISC) core, a complex instruction set computing (CISC) core, a very long instruction word (VLIW) core, or a hybrid or alternative core type. As yet another option, the core 390 may be a special-purpose core, such as, for example, a network or communication core, compression engine, coprocessor core, general purpose computing graphics processing unit (GPGPU) core, graphics core, or the like.

The front end unit 330 includes a branch prediction unit 332 coupled to an instruction cache unit 334, which is coupled to an instruction translation lookaside buffer (TLB) 336, which is coupled to an instruction fetch unit 338, which is coupled to a decode unit 340. The decode unit 340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 390 includes a microcode ROM or other medium that stores microcode for certain macroinstructions (e.g., in decode unit 340 or otherwise within the front end unit 330). The decode unit 340 is coupled to a rename/allocator unit 352 in the execution engine unit 350.

The execution engine unit 350 includes the rename/allocator unit 352 coupled to a retirement unit 354 and a set of one or more scheduler unit(s) 356. The scheduler unit(s) 356 represents any number of different schedulers, including reservations stations, central instruction window, etc. The scheduler unit(s) 356 is coupled to the physical register file(s) unit(s) 358. Each of the physical register file(s) units 358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 358 comprises a vector registers unit, a write mask registers unit, and a scalar registers unit. These register units may provide architectural vector registers, vector mask registers, and general purpose registers. The physical register file(s) unit(s) 358 is overlapped by the retirement unit 354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 354 and the physical register file(s) unit(s) 358 are coupled to the execution cluster(s) 360. The execution cluster(s) 360 includes a set of one or more execution units 362 and a set of one or more memory access units 364. The execution units 362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 356, physical register file(s) unit(s) 358, and execution cluster(s) 360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 364). It should also be understood that where separate pipelines are used, one or more of these pipelines may be out-of-order issue/execution and the rest in-order.

The set of memory access units 364 is coupled to the memory unit 370, which includes a data TLB unit 372 coupled to a data cache unit 374 coupled to a level 2 (L2) cache unit 376. In one exemplary embodiment, the memory access units 364 may include a load unit, a store address unit, and a store data unit, each of which is coupled to the data TLB unit 372 in the memory unit 370. The instruction cache unit 334 is further coupled to a level 2 (L2) cache unit 376 in the memory unit 370. The L2 cache unit 376 is coupled to one or more other levels of cache and eventually to a main memory.

By way of example, the exemplary register renaming, out-of-order issue/execution core architecture may implement the pipeline 300 as follows: 1) the instruction fetch 338 performs the fetch and length decoding stages 302 and 304; 2) the decode unit 340 performs the decode stage 306; 3) the rename/allocator unit 352 performs the allocation stage 308 and renaming stage 310; 4) the scheduler unit(s) 356 performs the schedule stage 312; 5) the physical register file(s) unit(s) 358 and the memory unit 370 perform the register read/memory read stage 314; the execution cluster 360 perform the execute stage 316; 6) the memory unit 370 and the physical register file(s) unit(s) 358 perform the write back/memory write stage 318; 7) various units may be involved in the exception handling stage 322; and 8) the retirement unit 354 and the physical register file(s) unit(s) 358 perform the commit stage 324.

The core 390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 334/374 and a shared L2 cache unit 376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 4B:
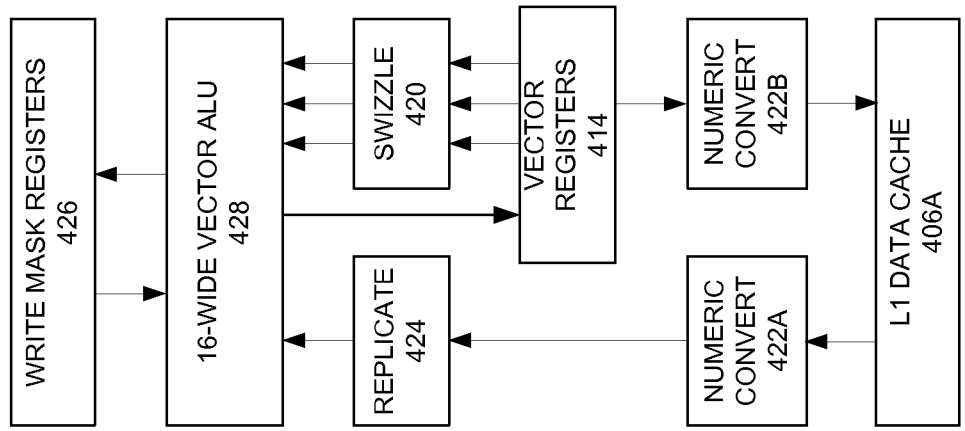
FIGS. 4A-B illustrate block diagrams of a more specific exemplary in-order core architecture.
Figure 4A:
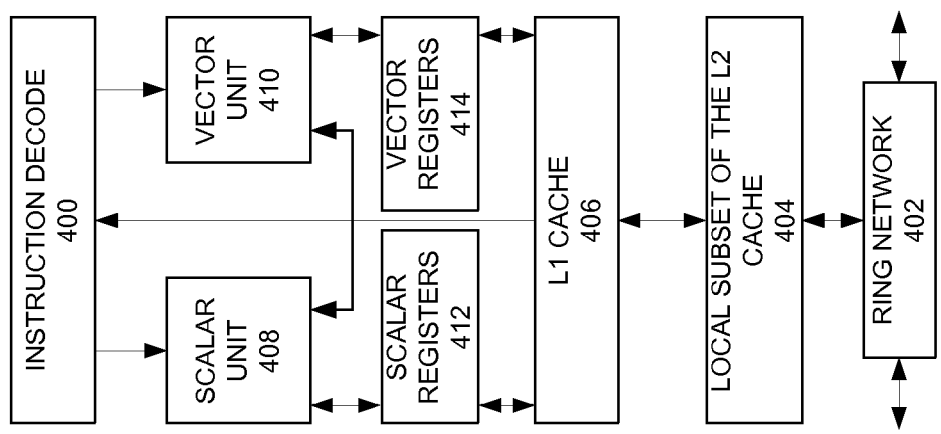

FIGS. 4A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 4A is a block diagram of a single processor core, along with its connection to the on-die interconnect network 402 and with its local subset of the Level 2 (L2) cache 404, according to embodiments of the invention. In one embodiment, an instruction decoder 400 supports the x86 instruction set with a packed data instruction set extension. An L1 cache 406 allows low-latency accesses to cache memory into the scalar and vector units. While in one embodiment (to simplify the design), a scalar unit 408 and a vector unit 410 use separate register sets (respectively, scalar registers 412 and vector registers 414) and data transferred between them is written to memory and then read back in from a level 1 (L1) cache 406, alternative embodiments of the invention may use a different approach (e.g., use a single register set or include a communication path that allow data to be transferred between the two register files without being written and read back).

The local subset of the L2 cache 404 is part of a global L2 cache that is divided into separate local subsets, one per processor core. Each processor core has a direct access path to its own local subset of the L2 cache 404. Data read by a processor core is stored in its L2 cache subset 404 and can be accessed quickly, in parallel with other processor cores accessing their own local L2 cache subsets. Data written by a processor core is stored in its own L2 cache subset 404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 4B is an expanded view of part of the processor core in FIG. 4A according to embodiments of the invention. FIG. 4B includes an L1 data cache 406A part of the L1 cache 404, as well as more detail regarding the vector unit 410 and the vector registers 414. Specifically, the vector unit 410 is a 16-wide vector processing unit (VPU) (see the 16-wide ALU 428), which executes one or more of integer, single-precision float, and double-precision float instructions. The VPU supports swizzling the register inputs with swizzle unit 420, numeric conversion with numeric convert units 422A-B, and replication with replication unit 424 on the memory input. Write mask registers 426 allow predicating resulting vector writes.

Processor with Integrated Memory Controller and Graphics

Figure 5:
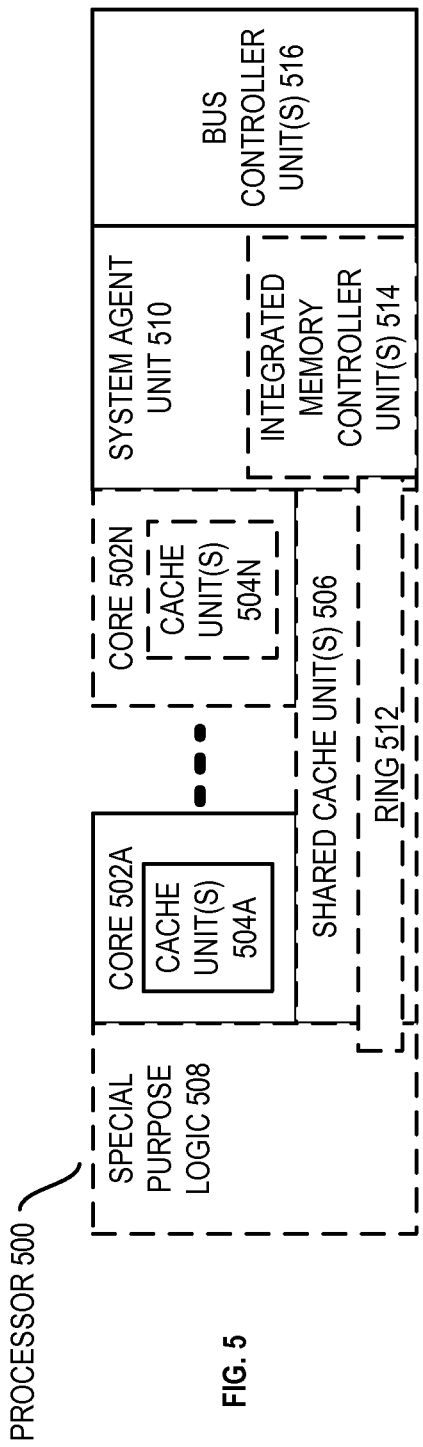
FIG. 5 is a block diagram of a processor.

FIG. 5 is a block diagram of a processor 500 that may have more than one core, may have an integrated memory controller, and may have integrated graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic 508.

Thus, different implementations of the processor 500 may include: 1) a CPU with the special purpose logic 508 being integrated graphics and/or scientific (throughput) logic (which may include one or more cores), and the cores 502A-N being one or more general purpose cores (e.g., general purpose in-order cores, general purpose out-of-order cores, a combination of the two); 2) a coprocessor with the cores 502A-N being a large number of special purpose cores intended primarily for graphics and/or scientific (throughput); and 3) a coprocessor with the cores 502A-N being a large number of general purpose in-order cores. Thus, the processor 500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508, the set of shared cache units 506, and the system agent unit 510/integrated memory controller unit(s) 514, alternative embodiments may use any number of well-known techniques for interconnecting such units. In one embodiment, coherency is maintained between one or more cache units 506 and cores 502-A-N.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture instruction set; that is, two or more of the cores 502A-N may be capable of execution the same instruction set, while others may be capable of executing only a subset of that instruction set or a different instruction set.

Exemplary Computer Architectures

FIGS. 6-9 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 6:
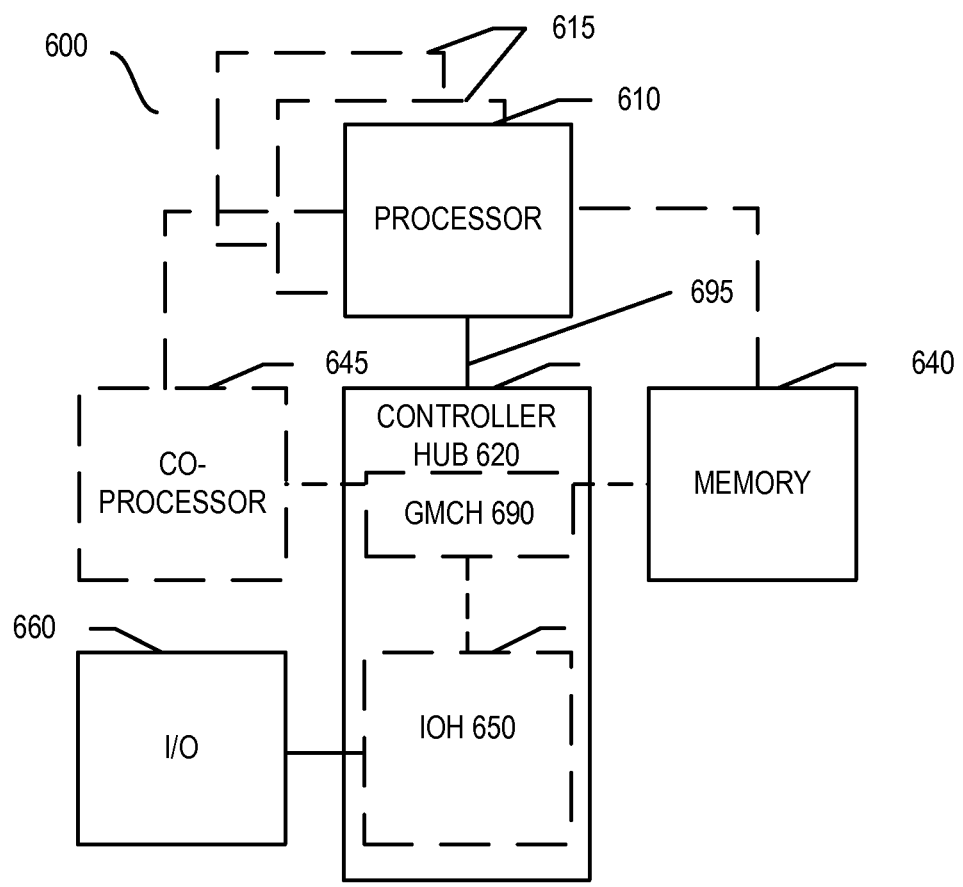
FIGS. 6-9 are block diagrams of exemplary computer architectures.

Referring now to FIG. 6, shown is a block diagram of a system 600 in accordance with one embodiment of the present invention. The system 600 may include one or more processors 610, 615, which are coupled to a controller hub 620. In one embodiment the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 is couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the IOH 650.

The optional nature of additional processors 615 is denoted in FIG. 6 with broken lines. Each processor 610, 615 may include one or more of the processing cores described herein and may be some version of the processor 500.

The memory 640 may be, for example, dynamic random access memory (DRAM), phase change memory (PCM), or a combination of the two. For at least one embodiment, the controller hub 620 communicates with the processor(s) 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the physical resources 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645. Coprocessor(s) 645 accept and execute the received coprocessor instructions.

Figure 7:
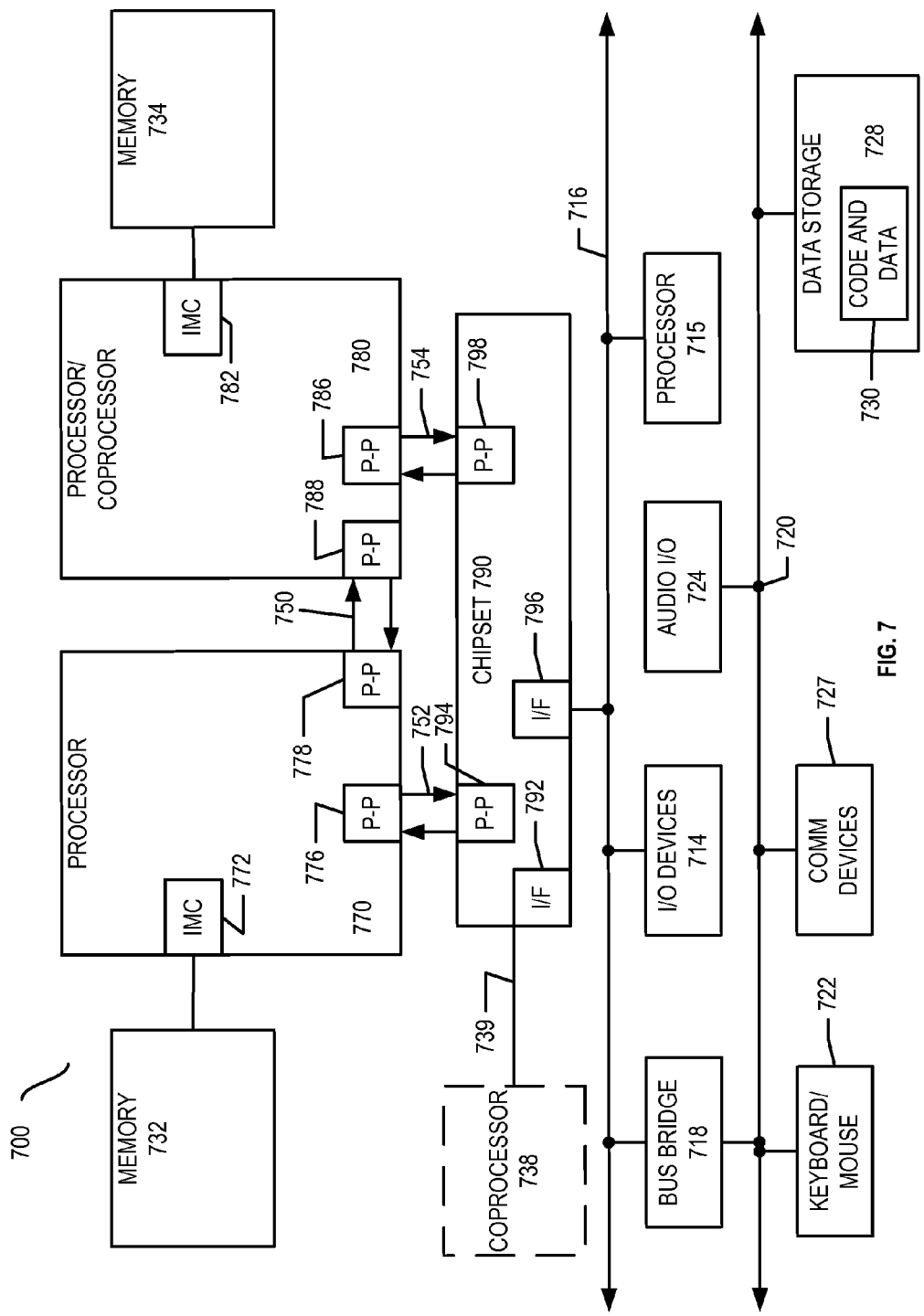

Referring now to FIG. 7, shown is a block diagram of a first more specific exemplary system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500. In one embodiment of the invention, processors 770 and 780 are respectively processors 610 and 615, while coprocessor 738 is coprocessor 645. In another embodiment, processors 770 and 780 are respectively processor 610 coprocessor 645.

Processors 770 and 780 are shown including integrated memory controller (IMC) units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 739. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Figure 8:
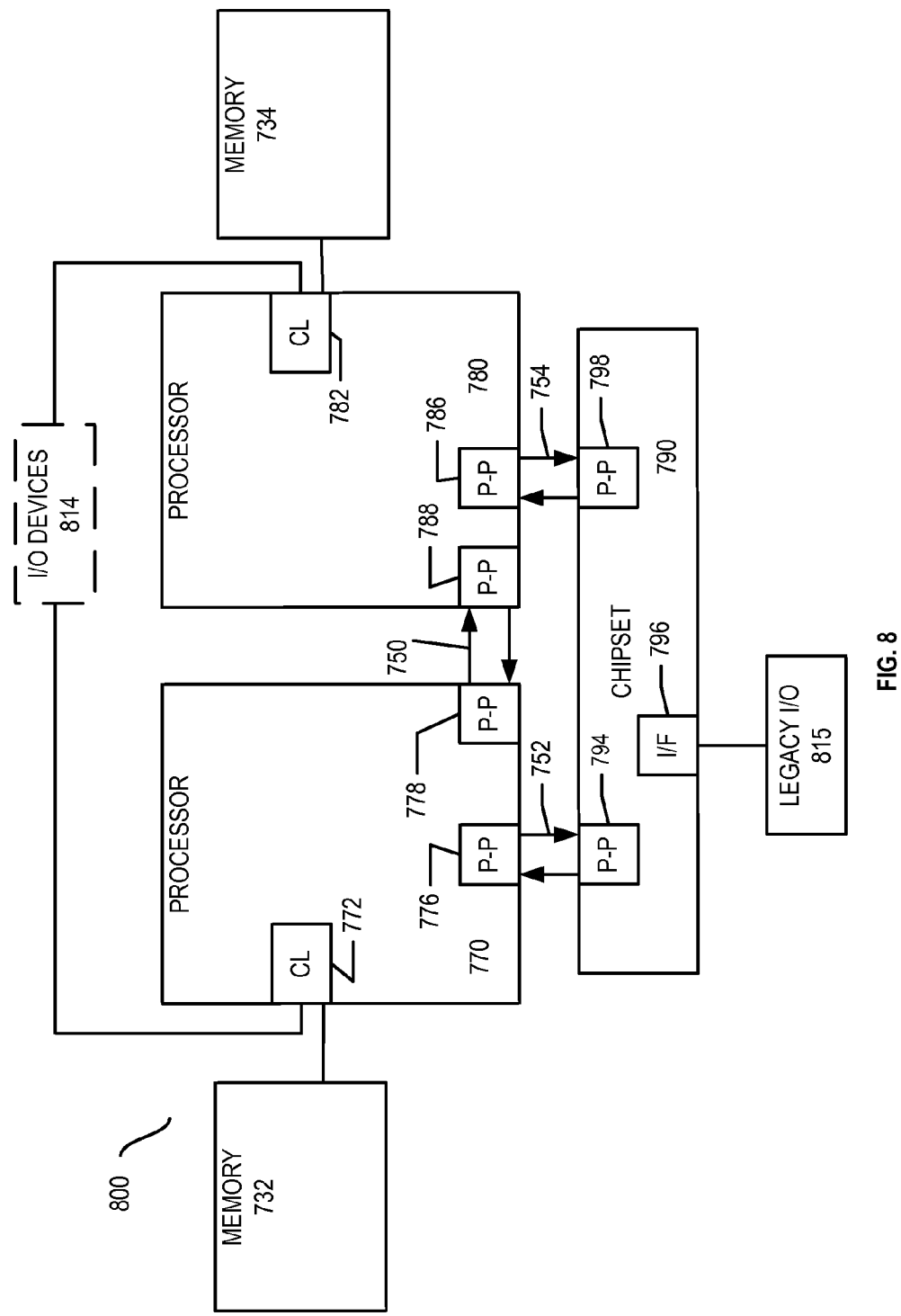

Referring now to FIG. 8, shown is a block diagram of a second more specific exemplary system 800 in accordance with an embodiment of the present invention Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 770, 780 may include integrated memory and I/O control logic ("CL") 772 and 782, respectively. Thus, the CL 772, 782 include integrated memory controller units and include I/O control logic. FIG. 8 illustrates that not only are the memories 732, 734 coupled to the CL 772, 782, but also that I/O devices 814 are also coupled to the control logic 772, 782. Legacy I/O devices 815 are coupled to the chipset 790.

Figure 9:
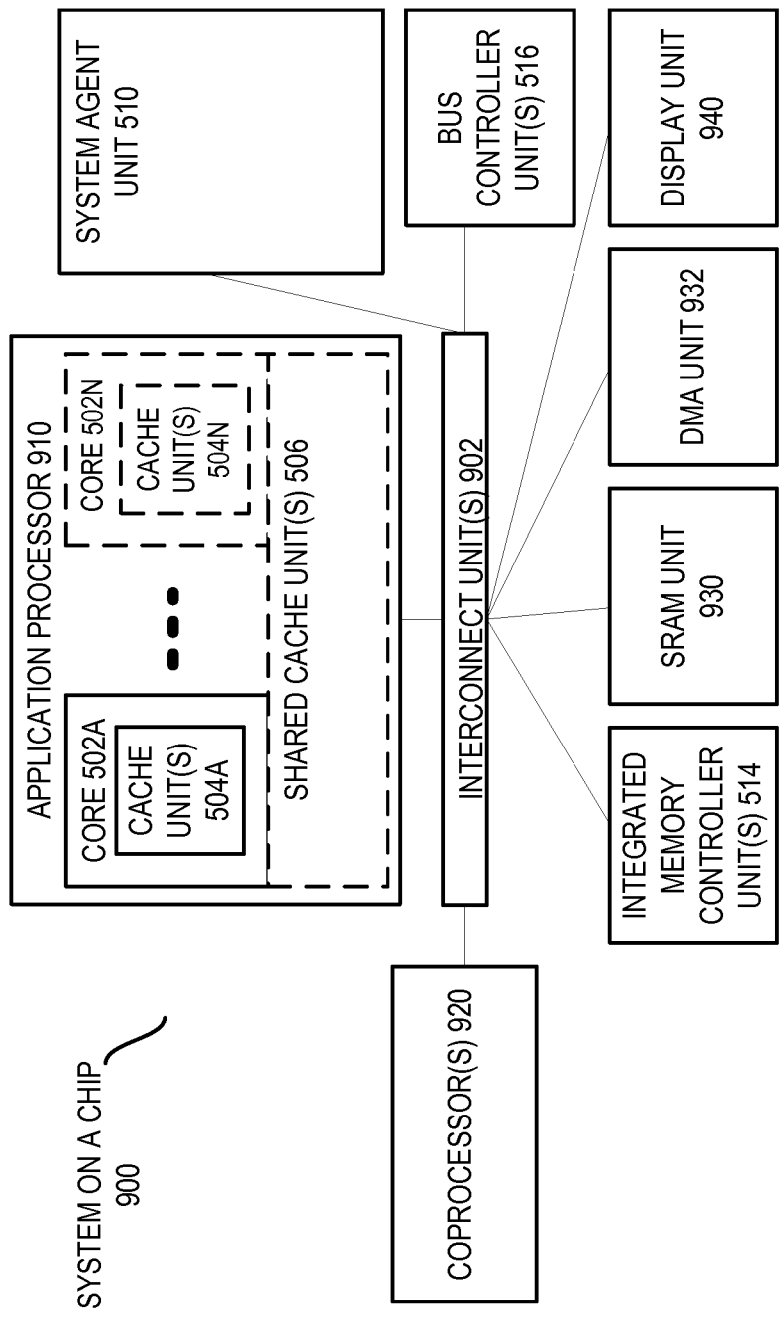

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 202A-N and shared cache unit(s) 506; a system agent unit 510; a bus controller unit(s) 516; an integrated memory controller unit(s) 514; a set or one or more coprocessors 920 which may include integrated graphics logic, an image processor, an audio processor, and a video processor; an static random access memory (SRAM) unit 930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 10:
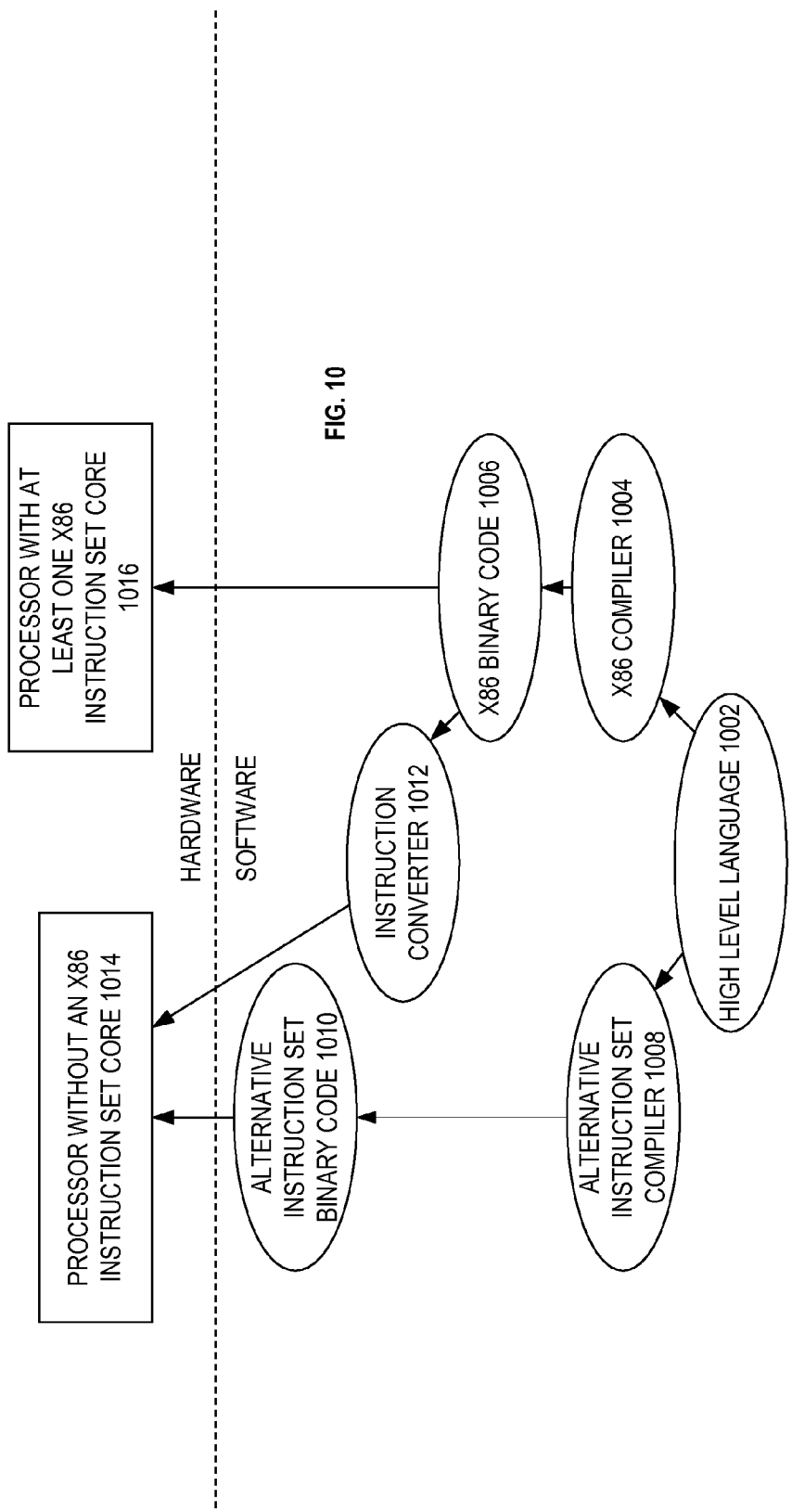
FIG. 10 is a block diagram contrasting the use of a software instruction converter to convert binary instructions in a source instruction set to binary instructions in a target instruction set according to embodiments of the invention.

FIG. 10 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 10 shows a program in a high level language 1002 may be compiled using an x86 compiler 1004 to generate x86 binary code 1006 that may be natively executed by a processor with at least one x86 instruction set core 1016. The processor with at least one x86 instruction set core 1016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1004 represents a compiler that is operable to generate x86 binary code 1006 (e.g., object code) that can, with or without additional linkage processing, be executed on the processor with at least one x86 instruction set core 1016. Similarly, FIG. 10 shows the program in the high level language 1002 may be compiled using an alternative instruction set compiler 1008 to generate alternative instruction set binary code 1010 that may be natively executed by a processor without at least one x86 instruction set core 1014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1012 is used to convert the x86 binary code 1006 into code that may be natively executed by the processor without an x86 instruction set core 1014. This converted code is not likely to be the same as the alternative instruction set binary code 1010 because an instruction converter capable of this is difficult to make; however, the converted code will accomplish the general operation and be made up of instructions from the alternative instruction set. Thus, the instruction converter 1012 represents software, firmware, hardware, or a combination thereof that, through emulation, simulation or any other process, allows a processor or other electronic device that does not have an x86 instruction set processor or core to execute the x86 binary code 1006.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

What is claimed is:

1. A system for efficient energy consumption comprising:
   a device external to a central processing unit (CPU), the device comprising software registers to receive commands and hardware registers to maintain context;
   a static memory dedicated to the device;
   a sustain power rail to provide power to the device during a deep power down state; and
   a power control unit, separate from a memory controller including a graphics controller, and coupled with the device and the static memory, the power control unit comprising a deep power down logic to:
   monitor a status of the device, the status including commands written to the software registers;
   transfer the device to a deep power down state when the device is idle, the transfer being transparent to the central processing unit; and
   cause context data obtained from the device to be stored in the static memory when the device is transferred to the deep power down state;
   wherein, during the deep power down state, the static memory is provided with a lower memory voltage than provided in an active state, the lower memory voltage sufficient to enable the static memory to maintain its storage; and
   wherein, during the deep power down state, the sustain power rail to provide the device with a lower device voltage than provided in the active state, the lower device voltage sufficient to enable the device to receive commands and store them in the software registers, and to maintain contents of the hardware registers.

2. The system of claim 1, further comprising:
   in response to the deep power down logic monitoring an event, the deep power down logic to wake the device, wherein the deep power down logic is to transfer the device to the active state, to cause the context data to be loaded from the static memory into the device, and to provide an active device voltage and an active memory voltage to the static memory and to the device, respectively.

3. The system of claim 2, wherein the event is a processor of the system waking from an idle state.

4. The system of claim 2, wherein the event is an event to be processed by the device, and where a processor of the system remains in an idle state.

5. The system of claim 1, wherein the deep power down logic determines that the device is idle and initiates the transfer when a processor of the system enters into an idle state.

6. The system of claim 1, wherein the deep power down logic initiates the transfer of the device to the deep power down state when a processor of the system is in an active state.

7. The system of claim 1, wherein the static memory is coupled with a sustain power well to provide power to the static memory.

8. The system of claim 1, wherein the device is a graphics processing unit.

9. The system of claim 1, wherein the deep power down state is a C6 state.

10. The system of claim 1, wherein the deep power down logic is a hardware-based finite state machine.

11. The system of claim 1, wherein the static memory is SRAM dedicated to context storage for the deep power down state.

12. An apparatus for efficient energy consumption comprising:
    a device comprising software registers to receive commands and hardware registers to maintain context;
    a static memory dedicated to the device;
    a sustain power rail to provide power to the device during a deep power down state; and
    a power control unit, separate from a memory controller including a graphics controller, and coupled with the device and the static memory, the power control unit comprising a deep power down logic to:
    monitor a status of the device, the status including commands written to the software registers; and
    when the device is idle, to transfer the device to a deep power down state and to cause context data obtained from the device to be stored in the static memory, the transfer being transparent to the central processing unit;
    wherein, while in the deep power down state, the static memory is provided with a lower memory voltage than provided in an active state, the lower memory voltage sufficient to enable the static memory to maintain its storage; and
    wherein, while in the deep power down state, the sustain power rail to provide the device with a lower device voltage-than provided in the active state, the lower device voltage to sufficient enable the device to allow reads and writes to the software registers, and to maintain contents of the software registers and hardware registers.

13. The apparatus of claim 12, wherein the static memory is incorporated in the device.

14. The apparatus of claim 12, wherein the static memory is SRAM dedicated to context storage for the deep power down state.

15. A method for efficient energy consumption by a system comprising a device external to a central processing unit (CPU), the device comprising software registers to receive commands and hardware registers to maintain context, a static memory dedicated to the device, a sustain power rail to provide power to the device during a deep power down state, and a power control unit separate from a memory controller including a graphics controller, and coupled with the device and the static memory, the power control unit comprising a deep power down logic to perform the a procedure comprising:
- monitoring a status of the device, the status including commands written to the software registers;
- transferring the device to a deep power down state when the device is idle, the transfer being transparent to the central processing unit; and
- when the device is transferred to the deep power down state, causing context to be stored in the static memory and in the hardware registers;
- during the deep power down state, providing the static memory with a lower memory voltage than is provided in an active state, the lower memory voltage sufficient to enable the static memory to maintain its storage; and
- during the deep power down state, the sustain power rail providing the device with a lower device voltage than is provided in the active state, the lower device voltage sufficient to enable the device to receive commands and store them in the software registers, and to maintain contents of the hardware registers.

16. The method of claim 15, further comprising:
in response to the deep power down logic detecting an event, the deep power down logic to wake the device, to transfer the device to the active state, to cause the context data to be loaded from the static memory into the device, and to cause an active device voltage and an active memory voltage to be provided to the static memory and to the device, respectively.

17. The method of claim 16, wherein the event is the CPU waking from an idle state.

18. The method of claim 16, wherein the event is an event to be processed by the device, and where the CPU remains in an idle state.

19. The method of claim 15, further comprising determining, by the deep power down logic, that the device is idle and initiating the transfer when the CPU enters into an idle state.

20. The method of claim 15, wherein the initiating the transfer of the device to the deep power down state to occur when the CPU is in an active state.

21. The method of claim 15, further comprising providing power to the static memory by a sustain power well.

22. The method of claim 15, wherein the device is a graphics processing unit.

23. The method of claim 15, wherein the deep power down state is a C6 state.

24. The method of claim 15, wherein the static memory is SRAM dedicated to context storage for the deep power down state.

* * * * *